United States Patent
Dezfouli et al.

(10) Patent No.: US 12,498,523 B2
(45) Date of Patent: Dec. 16, 2025

(54) COMPACT OPTICAL SPLITTER

(71) Applicant: Apple Inc., Cupertino, CA (US)

(72) Inventors: Mohsen Kamandar Dezfouli, San Jose, CA (US); Maria Anagnosti, Santa Cruz, CA (US); Jason S. Pelc, Sunnyvale, CA (US); Yu Miao, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 62 days.

(21) Appl. No.: 18/142,729

(22) Filed: May 3, 2023

(65) Prior Publication Data

US 2023/0358964 A1    Nov. 9, 2023

(30) Foreign Application Priority Data

May 5, 2022 (EP) .................................... 22386024

(51) Int. Cl.
*G02B 6/28* (2006.01)

(52) U.S. Cl.
CPC .................................. *G02B 6/2804* (2013.01)

(58) Field of Classification Search
CPC ... G02B 6/2804; G02B 6/2808; G02B 6/2813
See application file for complete search history.

(56) References Cited

U.S. PATENT DOCUMENTS

| | | |
|---|---|---|
| 3,920,314 A | 11/1975 | Hiroyoshi |
| 4,786,131 A * | 11/1988 | Mahapatra .............. G02B 6/125 385/24 |
| 4,934,775 A | 6/1990 | Koai |
| 5,044,715 A | 9/1991 | Kawachi |
| 5,379,354 A | 1/1995 | Jenkins |
| 5,524,156 A | 6/1996 | Van Der Tol |
| 5,544,268 A | 8/1996 | Bischel |
| 5,586,206 A | 12/1996 | Brinkman |
| 5,647,036 A | 7/1997 | Deacon |
| 5,652,817 A | 7/1997 | Brinkman |
| 5,664,032 A | 9/1997 | Bischel |
| 5,718,989 A | 2/1998 | Aoki |
| 5,724,463 A | 3/1998 | Deacon |
| 5,790,720 A | 8/1998 | Marcuse |

(Continued)

FOREIGN PATENT DOCUMENTS

| | | |
|---|---|---|
| CN | 201177670 Y | 1/2009 |
| CN | 109445026 | 12/2020 |

(Continued)

OTHER PUBLICATIONS

Translation of JP04204508A (Year: 1992).*

(Continued)

*Primary Examiner* — Chad H Smith
(74) *Attorney, Agent, or Firm* — Brownstein Hyatt Farber Schreck, LLP

(57) ABSTRACT

Optical splitters and system and methods utilizing optical splitters are disclosed. The optical splitter may include an input waveguide, a free propagation region, and a plurality output waveguides. The output waveguides are connected to the free propagation region at a corresponding plurality of output ports that are positioned along a non-circular path. The output ports may be positioned such that the output waveguides have the same width.

17 Claims, 5 Drawing Sheets

(56) References Cited

U.S. PATENT DOCUMENTS

| | | |
|---|---|---|
| 5,799,199 A | 8/1998 | Ito et al. |
| 5,818,989 A | 10/1998 | Nakamura |
| 5,835,458 A | 11/1998 | Bischel |
| 5,911,018 A | 6/1999 | Bischel |
| 5,912,997 A | 6/1999 | Bischel |
| 5,923,801 A | 7/1999 | Werner et al. |
| 5,978,524 A | 11/1999 | Bischel |
| 6,014,390 A | 1/2000 | Joyner |
| 6,078,704 A | 6/2000 | Bischel |
| 6,118,908 A | 9/2000 | Bischel |
| 6,141,465 A | 10/2000 | Bischel |
| 6,167,169 A | 12/2000 | Brinkman |
| 6,393,185 B1 | 5/2002 | Deacon |
| 6,415,080 B1 | 7/2002 | Sappey et al. |
| 6,522,794 B1 | 2/2003 | Bischel |
| 6,643,432 B2 | 11/2003 | Bouda |
| 6,674,949 B2 | 1/2004 | Allan et al. |
| 6,842,545 B2 | 1/2005 | Lackritz et al. |
| 6,882,758 B2 | 4/2005 | Betty |
| 6,903,820 B2 | 6/2005 | Wang |
| 6,934,447 B2 | 8/2005 | Kim |
| 6,954,568 B2 | 10/2005 | Liu |
| 7,016,568 B2 | 3/2006 | Van Weerden et al. |
| 7,031,568 B2 | 4/2006 | Laming et al. |
| 7,103,247 B2 | 9/2006 | Yamazaki et al. |
| 7,149,387 B2 | 12/2006 | Balakrishnan et al. |
| 7,151,635 B2 | 12/2006 | Bidnyk et al. |
| 7,263,394 B2 | 8/2007 | Wang |
| 7,324,195 B2 | 1/2008 | Packirisamy et al. |
| 7,327,918 B2 | 2/2008 | Yamazaki et al. |
| 7,366,421 B2 | 4/2008 | Cho et al. |
| 7,421,167 B2 | 9/2008 | Charters et al. |
| 7,595,879 B2 | 9/2009 | Wang |
| 7,831,298 B1 | 11/2010 | Wang |
| 7,840,108 B2 | 11/2010 | Miyadera |
| 7,876,983 B2 | 1/2011 | Doerr |
| 7,970,458 B2 | 6/2011 | Norris et al. |
| 7,974,504 B2 | 7/2011 | Nagarajan et al. |
| 7,999,938 B2 | 8/2011 | Wang |
| 8,411,260 B1 | 4/2013 | Feng |
| 8,498,681 B2 | 7/2013 | Wang et al. |
| 9,052,447 B2 | 6/2015 | Luo et al. |
| 9,151,894 B2 | 10/2015 | Okano et al. |
| 9,176,282 B2 | 11/2015 | Pottier |
| 9,369,201 B2 | 6/2016 | Luo et al. |
| 9,395,494 B2 | 7/2016 | Krishnamurthi et al. |
| 9,557,482 B2 | 1/2017 | Oka et al. |
| 9,588,295 B2 | 3/2017 | Onawa |
| 9,678,012 B2 | 6/2017 | Rothberg et al. |
| 9,759,865 B1 | 9/2017 | Lin |
| 9,784,679 B2 | 10/2017 | Rothberg et al. |
| 9,817,296 B2 | 11/2017 | Sharkawy et al. |
| 9,869,816 B2 | 1/2018 | Ishikura et al. |
| 9,880,352 B2 | 1/2018 | Florjanczyk et al. |
| 9,977,187 B2 | 5/2018 | Shi et al. |
| 10,126,498 B1 | 11/2018 | Ma |
| 10,215,689 B2 | 2/2019 | Wang et al. |
| 10,359,571 B2 | 7/2019 | Horth |
| 10,495,813 B2 | 12/2019 | Mahgerefteh et al. |
| 10,520,672 B2 | 12/2019 | Ma et al. |
| 10,551,567 B2 | 2/2020 | Wang et al. |
| 10,578,806 B2 | 3/2020 | Lamponi et al. |
| 10,901,148 B2 | 1/2021 | Ma et al. |
| 10,935,726 B1 | 3/2021 | Lee |
| 10,976,489 B2 | 4/2021 | Jou et al. |
| 10,983,200 B1 | 4/2021 | Shen et al. |
| 11,022,522 B2 | 6/2021 | Piazza et al. |
| 11,079,542 B2 | 8/2021 | Fertig et al. |
| 11,079,547 B2 | 8/2021 | Trita |
| 11,131,809 B2 | 9/2021 | Villafranca Velasco |
| 11,231,319 B1 | 1/2022 | Tu et al. |
| 11,280,960 B2 | 3/2022 | Qi et al. |
| 11,320,720 B2 | 5/2022 | Puckett et al. |
| 11,402,581 B2 | 8/2022 | Baba |
| 11,480,731 B2 | 10/2022 | Liu et al. |
| 11,500,154 B1 | 11/2022 | Tu et al. |
| 11,506,535 B1 | 11/2022 | Tu et al. |
| 11,561,346 B2 | 1/2023 | Tu |
| 11,630,262 B2 | 4/2023 | Shin et al. |
| 11,644,619 B2 | 5/2023 | Qi et al. |
| 2003/0091265 A1 | 5/2003 | Lin et al. |
| 2003/0113066 A1* | 6/2003 | Kim ............ G02B 6/125 385/39 |
| 2003/0133663 A1 | 7/2003 | Orignac et al. |
| 2005/0031267 A1 | 2/2005 | Sumimoto |
| 2006/0002653 A1 | 1/2006 | Grunnet-Jepsen et al. |
| 2006/0039646 A1 | 2/2006 | Nashimoto |
| 2007/0217739 A1 | 9/2007 | McGreer et al. |
| 2008/0138008 A1 | 6/2008 | Tolstikhin et al. |
| 2008/0266639 A1 | 10/2008 | Melloni et al. |
| 2012/0002924 A1 | 1/2012 | Okayama |
| 2013/0156361 A1 | 6/2013 | Kojima et al. |
| 2014/0270620 A1 | 9/2014 | Anderson et al. |
| 2015/0104130 A1 | 4/2015 | Anderson et al. |
| 2015/0338577 A1 | 11/2015 | Shi et al. |
| 2019/0052063 A1 | 2/2019 | Tolstikhin |
| 2020/0333530 A1 | 10/2020 | Lin et al. |
| 2021/0191039 A1 | 6/2021 | Jou et al. |
| 2021/0270699 A1 | 9/2021 | Piazza et al. |
| 2022/0043207 A1 | 2/2022 | Bian |
| 2022/0091333 A1 | 3/2022 | Wu |
| 2022/0099889 A1 | 3/2022 | Arbore et al. |
| 2023/0071329 A1 | 3/2023 | Wu et al. |
| 2023/0094833 A1 | 3/2023 | Wu |
| 2023/0103057 A1 | 3/2023 | Wang et al. |
| 2023/0110382 A1 | 4/2023 | Wu et al. |
| 2023/0125733 A1 | 4/2023 | Thomas et al. |
| 2024/0077686 A1 | 3/2024 | Pelc et al. |
| 2024/0103224 A1 | 3/2024 | Arbore et al. |

FOREIGN PATENT DOCUMENTS

| | | | |
|---|---|---|---|
| JP | 04204508 A * | 7/1992 | ............ G02B 6/12 |
| JP | H04204508 | 7/1992 | |
| JP | H063709 | 1/1994 | |
| JP | 2004246235 | 9/2004 | |
| JP | 2005284256 | 10/2005 | |
| JP | 2006284791 | 10/2006 | |
| JP | 2007279240 | 10/2007 | |
| JP | 2010223991 | 10/2010 | |
| JP | 2011232674 | 11/2011 | |
| JP | 2015152729 | 8/2015 | |
| JP | 2015197664 | 11/2015 | |
| JP | 2016148810 | 8/2016 | |
| JP | 2018004692 | 1/2018 | |
| KR | 10-2003-0049636 | 6/2003 | |
| KR | 10-2008-0094926 A | 10/2008 | |
| WO | WO 05/022223 | 11/2007 | |

OTHER PUBLICATIONS

U.S. Appl. No. 17/832,091, filed Jun. 3, 2022, Wu.

U.S. Appl. No. 17/903,875, filed Sep. 6, 2022, Pelc et al.

European Search Report dated Oct. 10, 2023, EP Application No. 22386024.8, 8 pages.

Dai et al., "Compact silicon-on-insulator-based multimode interference coupler with bilevel taper structure," *Applied Optics*, Optical Society of America, vol. 44, No. 24, 2005, pp. 5036-5041.

Dai et al., "10-Channel Mode (de)multiplexer with Dual Polarizations," *Laser & Photonics Reviews*, vol. 12, No. 1, Nov. 17, 2017, 9 pages.

He et al., "Integrated Polarization Compensator for WDM Waveguide Demultiplexers," *IEEE Photonics Technology Letters* vol. 11, No. 2, Feb. 1999, pp. 224-226.

Krubhakar et al., "Design and fabrication of integrated optical 1×8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

Li et al., "Compact and low-loss silicon power splitter based on inverse tapers," *Optics Letters*, Optical Society of America, vol. 38, No. 20, 2013, pp. 4220-4223.

(56) References Cited

OTHER PUBLICATIONS

Liu et al., "Silicon Multimode Waveguide Grating Filter at 2 μm," *Journal of Lightwave Technology*, IEEE USA, vol. 37, No. 10, May 15, 2019, pp. 2217-2222.
Rasigade et al., "Compact wavelength-insensitive fabrication-tolerant silicon-on-insulator beam splitter," *Optics Letters*, Optical Society of America, vol. 35, No. 21, 2010, pp. 3700-3702.
U.S. Appl. No. 18/230,475, filed Aug. 2023, Arbore et al.
T. Murphy et al. "Wavelength and polarisation-intensive integrated directional couplers using Mach-Zehnder structures" (1999) Integrated Photonics Research, OSA Technical Digest Series (Optica Publishing Group).
Wang et al., "Ultra-broadband and low-loss 3 dB optical power splitter based on adiabatic silicon waveguides" (May 2016) Optics Letters 41(9) 2056-2057.

\* cited by examiner

COMPACT OPTICAL SPLITTER

CROSS-REFERENCE TO RELATED APPLICATION

This application claims the benefit under 35 U.S.C. § 119(a) of European Patent Application No. EP 22386024.8, filed May 5, 2022, the contents of which are incorporated herein by reference as if fully disclosed herein.

FIELD

This disclosure relates generally to optical splitters, and systems and methods of using these splitters. More particularly, this disclosure relates to optical splitters having output waveguides placed along a non-circular path to provide a compact optical splitter with low optical losses, and that may operate over a wide range of wavelengths.

BACKGROUND

Optical power splitters are often used in a photonic integrated circuit to split, combine, or redirect light. For example, a power splitter may split light received from an input into multiple outputs. Optical splitters typically increase in size and/or complexity as the number of outputs increases, as it becomes more difficult to evenly split light between outputs while maintaining a small form factor and low optical losses. This is further complicated as the target bandwidth of the splitter (i.e., the range of wavelengths across which the optical splitter is expected to perform) increases. Since space is at a premium in many devices, an optical splitter may place significant size constraints on a photonics integrated circuit depending on the number of outputs and performance requirements of the optical splitter. It may thus be desirable to provide compact optical splitters with low optical losses.

SUMMARY

Embodiments of the systems, devices, methods, and apparatuses described in the present disclosure are directed to an optical device for splitting light. In some instances, an optical splitter is configured to split input light having one or more wavelengths in a predetermined wavelength range. The optical splitter includes a free propagation region comprising an input port and a plurality of output ports, an input waveguide optically coupled to the free propagation region at the input port, and a plurality of output waveguides. In some of these instances each output waveguide of the plurality of waveguides is connected to the free propagation at a corresponding output port of the plurality of output ports, has substantially the same width; and is positioned such that the average coefficient of variation for the plurality of output waveguides across the predetermined range of wavelengths is less than 0.30.

In some of these variations, each output port of the plurality of output ports is positioned in a far field section of the free propagation region. In some of these variations, each output waveguide of the plurality of output waveguides extends away from the corresponding output port along a Poynting vector of the input light at the corresponding output port.

In other variations the plurality of output ports are positioned along a non-circular path. In some of these instances, the non-circular path has an oval shape. The oval shape may have a length axis that is parallel to a direction along which the input waveguide connects to the free propagation region. Additionally or alternatively, the plurality of output waveguides includes a first set of output waveguides positioned on a first side of the width axis of the oval shape, and a second set of output waveguides positioned on a second side of the width axis of the oval shape. In some variations, the predetermined wavelength range has a bandwidth of at least 500 nanometers Other embodiments include an optical splitter operable to split input light having one or more wavelengths in a predetermined wavelength range and that includes an input waveguide operable to receive the input light, a slab waveguide with an input port and multiple output ports and operable to receive the input light from the input waveguide at the input port, and multiple output waveguides connected to the slab waveguide at the multiple output ports. The multiple output ports are positioned along a non-circular path that is centered in the free propagation region, and the multiple output waveguides are positioned such that when the input light is introduced into the input waveguide, the multiple waveguides each receive output light.

In some of these variations, the multiple output waveguides have an average coefficient of variation across the predetermined range of wavelengths that is less than 0.30. Additionally or alternatively, each output port of the multiple of output ports is positioned in a far field section of the slab waveguide. In some variations, the non-circular path has an oval shape. In some of these instances the oval shape is an ellipse.

Yet other embodiments include an optical system having a light source unit configured to generate input light having one or more wavelengths in a predetermined range of wavelengths, and an optical splitter optically coupled to receive the input light. The optical splitter includes a free propagation region comprising an input port and a plurality of output ports, an input waveguide optically coupled to the free propagation region at the input port, and a plurality of output waveguides. Each output waveguide of the plurality of waveguides is connected to the free propagation at a corresponding output port of the plurality of output ports and has substantially the same width, and the plurality of output ports are positioned such that when the input light is introduced into the input waveguide, the plurality of output waveguides have an average coefficient of variation across the predetermined range of wavelengths that is less than 0.30.

In some variations, each output port of the plurality of output ports is positioned in a far field section of the free propagation region. In some of these variations, each output waveguide of the plurality of output waveguides extends away from the corresponding output port along a Poynting vector of the input light at the corresponding output port. In some variations the plurality of output ports are positioned along a path having an oval shape. In some of these variation, the oval shape has a length axis that is parallel to a direction along which the input waveguide connects to the free propagation region.

Additionally or alternatively, the plurality of output waveguides includes a first set of output waveguides positioned on a first side of the width axis of the oval shape, and a second set of output waveguides positioned on a second side of the width axis of the oval shape. In some instances the predetermined wavelength range has a bandwidth of at least 500 nanometers.

In addition to the example aspects and embodiments described above, further aspects and embodiments will become apparent by reference to the drawings and by study of the following description.

Figure 1:
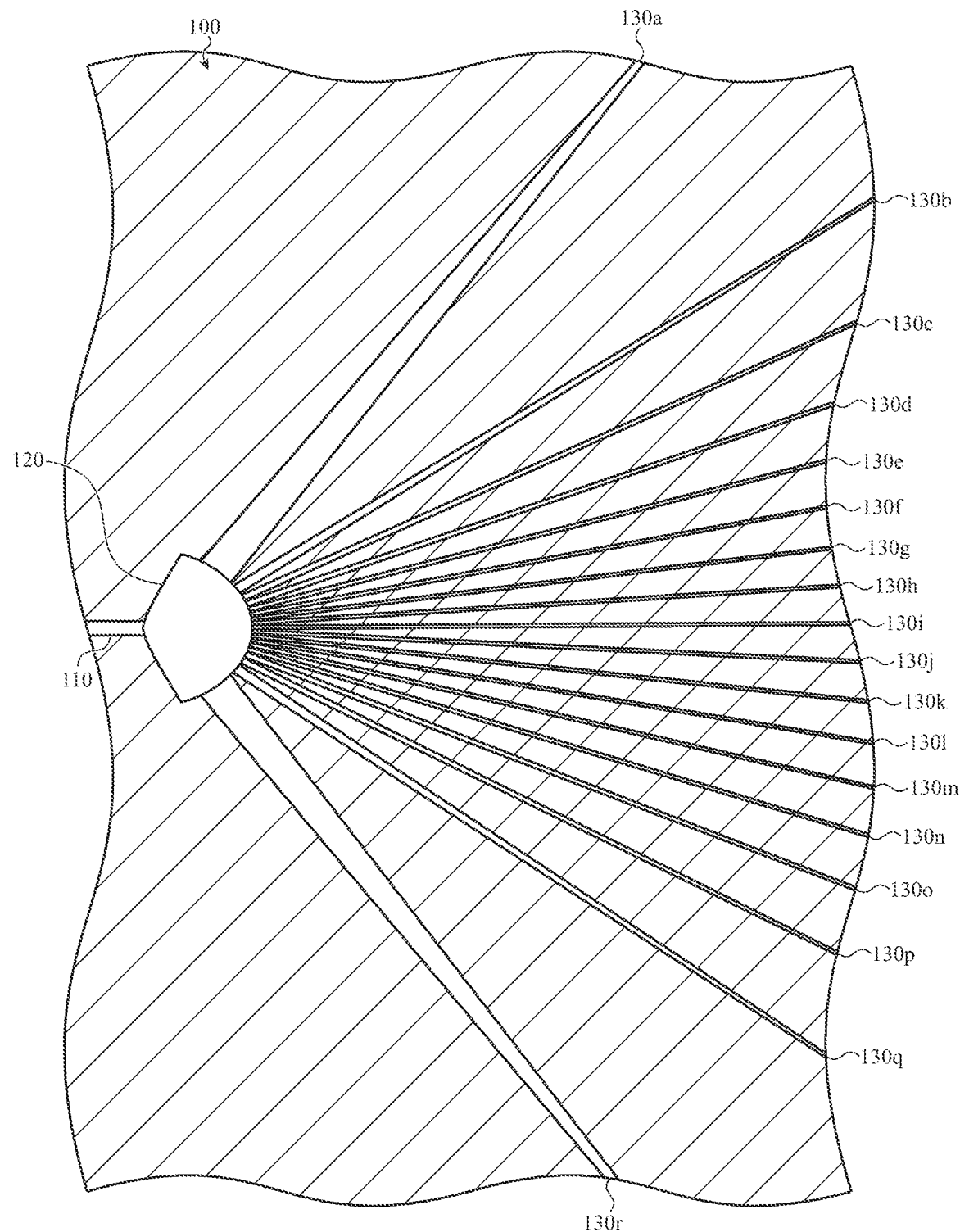
FIG. 1 depicts an example star coupler that is used to split light.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Disclosed herein are optical splitters, as well as systems and methods that utilize these optical splitters. In some instances, the optical splitter includes an input waveguide, a free propagation region connected to the input waveguide at an input port, and a plurality of output waveguides connected to the free propagation region at a corresponding plurality of output ports. The optical splitter is configured to receive input light at one or more wavelengths within a predetermined wavelength range, and split the input light between the plurality of output waveguides. In some instances, the plurality of output waveguides each have substantially the same width at its corresponding output port, and are positioned such that each output waveguide receives a similar portion of the input light. The output waveguides are placed along a non-circular path. The non-circular path may have a shape with a length dimension that is longer than its maximum width, as will be described in more detail below. The length dimension may be parallel to a direction along which the input waveguide connects to the free propagation region. In some instances, the non-circular path may have an oval shape.

These and other embodiments are discussed below with reference to FIGS. 2A-3. However, those skilled in the art will readily appreciate that the detailed description given herein with respect to these figures is for explanatory purposes only and should not be construed as limiting.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Overall, the optical splitters described herein may include a range of different numbers of output waveguides (e.g., more than fifteen output waveguides, more than thirty output waveguides) while still maintaining a compact profile and low optical losses as compared to other optical splitters with the same number of outputs. For example, known optical splitters may use directional couplers, in which the directional couplers may each be used to split light from one input into two output waveguides. To increase the number of output waveguides, multiple directional couplers need to be chained together in multiple stages. In these cascaded optical splitters, the number of directional couplers scales with the number of output waveguides, and the overall size of the optical splitter increases significantly as each new stage is added. As a result, cascaded light splitters can quickly become too large to fit within the size constraints of a given photonic integrated circuit ("PIC"). Insertion losses associated with individual directional couplers will result in larger overall losses as the number of directional couplers increases. Moreover, fabrication variations over the larger area encompassed by the directional couplers may further hinder performance.

In other known optical splitters, a star coupler is used to split light. FIG. 1 shows one such example of a star coupler 100. As shown there, the star coupler 100 includes an input waveguide 110, a propagation region 120, and a plurality of output waveguides 130a-130r. While lines are shown in FIG. 1 as dividing the input waveguide 110 from the propagation region 120, and dividing the propagation region 120 form the plurality of output waveguides 130a-130r, it should be appreciated that these components may all be formed together from a single material. Light that is introduced via the input waveguide 110 diffracts when it reaches the propagation region 120. The plurality of output waveguides 130a-130r are connected to the free propagation region 120 along a circular arc (e.g., a Rowland circle) and the diffracting light reaches each of the plurality of output waveguides 130a-130r to split light between the plurality of output waveguides 130a-130r.

The intensity of the diffracting light within the free propagation region 120 is not uniform, and light at a periphery of the free propagation region 120 is less intense than light traveling through the center of the free propagation region 120 (i.e., along the path of the input waveguide 110). To allow the star coupler 100 to evenly split input light between the plurality of output waveguides 130a-130r, the width of the output waveguides 130a-130r are varied such that width of the waveguides increases toward the periphery of the free propagation region 120. For example, as shown in FIG. 1, the output waveguides in the periphery (e.g., waveguides 130a-130e and 130n-130r) are each wider than the central waveguides (e.g., waveguides 130f-130m).

Increasing the width of an output waveguide typically increases the insertion losses associated with light entering that waveguide. Accordingly, star couplers, such as shown in FIG. 1, may provide for relatively even splitting of the input light at the cost of increased optical losses. Additionally, in instances where it is desirable for the optical splitter to have equal output waveguide widths, at least some of the output waveguides will taper as they move away from the free propagation region 120 to achieve the same width as other output waveguides. The space needed for the output waveguides to taper (especially when adiabatic tapering is used to avoid changing the mode of light within an output waveguide) can significantly increase the size of the star coupler 100, especially as the number of output waveguides increases.

Conversely, the optical splitters described here include a plurality of output waveguides that are positioned along a non-circular path, which allow the optical splitter to have a smaller size and less insertion loss when compared to cascaded optical splitters or star couplers having the same number of outputs. FIG. 2A depicts a variation of an optical splitter 200 as described herein, and FIGS. 2B and 2C depict enlarged views of the optical splitter 200. The optical splitter 200 includes an input waveguide 210, a free propagation region 220, and a plurality of output waveguides 230a-230r. The optical splitter 200 is configured to receive input light at any wavelength within a predetermined wavelength range via the input waveguide 210 and split the input light between the plurality of output waveguides 230a-230r, as will be described in more detail below. The input light may have a single wavelength at a time, and may split input light having different wavelengths at different points in time. Additionally or alternatively, the input light may have multiple wavelengths at the same time.

The input waveguide 210, free propagation region 220, and output waveguides 230a-230r are formed from one or more waveguide materials (e.g., silicon, silicon nitride, silica, or the like) surrounded by one or more cladding materials (e.g., a dielectric such as silicon dioxide, air, or the like). For example, the input waveguide 210, free propagation region 220, and output waveguides 230a-230r may be formed from one or more waveguide materials on a first cladding layer (not shown), for example using optical photolithography and etching techniques. A second cladding layer 215 (a portion of which is shown in FIGS. 2A-2C) or air may surround the remaining sides of the components of the optical splitter 200 to provide optical confinement thereto. While shown in FIGS. 2A-2C as being formed from a single waveguide material, some or all of the input waveguide 210, the free propagation region 220, the output waveguides 230a-230r, and subsections thereof may be formed different waveguide materials.

The input waveguide 210 is connected to the free propagation region 220 at an input port 222. The width of the free propagation region increases from the input port 222 toward the output waveguides, which results in diffraction of the input light as it enters the free propagation region. The angle of diffraction for a given input light depends on the ratio between the wavelength and the mode size of the input light as it reaches the free propagation region 220, which can result in different diffraction angles (and thus different power distribution between the output waveguides 230a-230r). This performance impact may be negligible when the optical splitter 200 is designed to be used for a small range of predetermined wavelength (e.g., a single wavelength), but may become more significant as optical splitter 200 is used with a wider range of predetermined wavelengths.

Accordingly, in some variations of the optical splitters described herein, the input waveguide 210 is tapered so that the width of the input waveguide 210 decreases as it approaches the free propagation region 220 and input port 222. If the input waveguide 210 is sufficiently narrow at the input port 222, the size of the mode of the input light becomes proportional to the wavelength of the input light across the predetermined range of wavelengths. This in turn can reduce the wavelength dependency of the diffraction and to provide a uniform diffraction angle across the predetermined range of wavelengths resulting in similarly splitting performance across this range. A tapered input waveguide 210 may be used to provide wavelength independence a relatively wide range of wavelengths. For example, in some instances the predetermined range of wavelengths spans at least 500 nanometers (i.e., the difference between the longest wavelength and the shortest wavelength of the predetermined range is at least 500 nanometers). In some of these instances, the predetermined range of wavelengths spans at least 1000 nanometers.

The free propagation region 220 is configured as a slab waveguide that allows the light received from the input waveguide 210 to propagate toward the plurality of output waveguides 230a-230r. In some variations, the free propagation region 220 is configured such that the input light that is diffracted into the free propagation region 220 reaches its far field before entering any of the output waveguides 230a-230r. Because the boundary between the near field and far field for the input light is wavelength dependent, the "far field section" of the free propagation region 220 for a given optical splitter is determined based on the longest wavelength in the predetermined range of wavelengths across which the optical splitter is configured to split light. In this way, regardless of what wavelength or wavelengths in the predetermined range of wavelengths are included in the input light, the input light will exhibit far field behavior when in the far field section of the free propagation region 220.

An example far field boundary 260 is shown in FIG. 2C, which represents the crossover between a near field section of the free propagation region 220, in which at least one wavelength in the predetermined range of wavelengths will exhibit near field behavior, and the far field section of the free propagation region 220. It should be appreciated that the shape of the far field boundary is dependent on the size, shape, and number of the input ports. When the input light reaches the far field section of the free propagation region 220, the modal shape of the input light does not change as the light travels along its Poynting vector (as opposed to variations that occur within the near field section). In this way, the modal shape of the input light remains constant as a function of propagation angle, which may help reduce insertion losses as light enters the output waveguides 230a-230r.

Specifically, the free propagation region 220 includes a plurality of output ports, and each of the plurality of output waveguides 230a-230r are connected to the free propagation region 220 at a corresponding output port of the plurality of output ports. To help illustrate this, FIG. 2C shows a first output waveguide 230a and a second output waveguide 230b connected to the free propagation region 220 respectively at a first output port 224a and a second output port 224b.

The boundary of free propagation region 220 is defined by a plurality of edge segments, one or more input ports, and the plurality of output ports. Each input waveguide and output waveguide has two sides (i.e., a first side and a second side) that terminate at the free propagation region 220. Specifically, for a given waveguide (e.g., an input waveguide or an output waveguide) the first side terminates at the free propagation region 220 at a first end point and the second side terminates at the free propagation region 220 at a second end point. The distance between the first end point and the second point defines the corresponding port (e.g., an input port or an output port) for that waveguide.

Each output waveguide of the plurality of waveguides 230a-230r has a first end connected to free propagation region 220 and a second end that provides light to another portion of an optical system that utilizes the optical splitter 200. In other words, when the optical splitter 200 receives input light within the predetermined wavelength range at input waveguide 210, every output waveguide of the optical splitter 200 will receive a portion of the input light at its first end and will output that light as "output light" at its second end. Additionally, each output waveguide may be separated from an adjacent output waveguides via edge segment.

Specifically, the plurality of output waveguides 230a-230r has a first end output waveguide 230a, a second end output waveguide 230r, and a set of intermediate output waveguides 230b-230q positioned between the end output waveguides (i.e., the first end output waveguide 230a and the second end output waveguide 230r) along a non-circular path 226. The first end output waveguide 230a represents the output waveguide that is closest to the input waveguide 210 on one side of the free propagation region 220, and the second end output waveguide 230r represents the output waveguide that is closest to the input waveguide 210 on an opposite side of the free propagation region 220.

Each of the set of intermediate output waveguides 230b-230q is positioned between two other immediately adjacent output waveguides, has a trailing side that connects to the free propagation region at a trailing edge segment, and a leading side opposite the trailing side that connects to the free propagation region at a leading edge segment. Accordingly, the gap between the trailing edge segment and the leading edge segment for a given output waveguide also defines the output port for that waveguide. The trailing edge segment for an output waveguide is positioned closer to the input port 222 than the leading edge segment (except in instances where the edge segments associated with a given output waveguide are equidistance to the input port 222, at which point either side of the waveguide may be considered the "leading side").

Similarly, each end output waveguide may have a leading side and a trailing side as discussed above. The leading side of the end waveguide connects to the free propagation region at a leading edge segment of the free propagation region 220. In some instances the free propagation region 220 may include edge segments connecting the trailing sides of each of the first and second edge output waveguides 230a, 230r to respective sides of the input port 222 (or ports). For example, as shown in FIG. 2C, the first end output waveguide 230a is separated by the input port 222 by edge segment 240. In these instances, the edge segments connecting the end output waveguides to the input waveguide cause the free propagation region 220 to provide an amount of optical confinement to light that reaches at least some of the plurality of output waveguides 230a-230r. In other instances, however, the free propagation region 220 between the input waveguide and the end output waveguides is sized such that this portion of the free propagation region does not provide any optical confinement of light that reaches the plurality of output waveguide 230a-230r. In these instances, the free propagation region 220 is considered to not have edge segments between the input waveguide and the end output waveguides, as the actual boundary (if any) between this portion of the free propagation region 220 and the cladding layer 215 will not impact the operation of the optical splitter 200.

FIG. 2C shows a first edge segment 240, a second edge segment 242, and a third edge segment 244 of the free propagation region. Edge segments 240 and 242 act as the trailing and leading edge segments, respectively, for the first end output waveguide 230a to define the first output port 224a, while the edge segments 242 and 244 act as the trailing and leading edge segments, respectively for the second output waveguide 230b to define the second output port 224b. The size of the edge segments between two immediately adjacent output ports determines the spacing between their corresponding output waveguides. Because insertion losses increase as this spacing between output ports increases, it may be desirable to minimize the size of the edge segment between two immediately adjacent output ports. In some instances, in some instances a given edge segment may approximate a point depending on manufacturing tolerances.

As mentioned above, in some variations the free propagation region 220 is configured such that each of the plurality of output ports are positioned in the far field. In some of these variations, each output waveguide of the plurality of output waveguides 230a-230r extends away from its corresponding output port along the Poynting vector of the input light at that position. This may reduce insertion losses as the input light passes between the free propagation region 220 and the plurality of output waveguides 230a-230r, which collectively reduces the overall optical losses associated with the optical splitter 200. It should be appreciated in these variations that once light has coupled into a given output waveguide, that output waveguide may curve or otherwise redirect light as desired.

To help reduce the size of the output coupler 200 and facilitate splitting light between the plurality of waveguides 230a-230r, it may be preferable to position at least some of the output ports in close proximity to the far field boundary 260. For example, in some instances the first and second end output waveguides 230a, 230r are each positioned such that their output port is within a threshold distance of the input port 222. In some instances, this threshold distance is less than eight times the longest wavelength of the predetermined wavelength range. In some of these variations, this threshold distance is less than five times the longest wavelength of the predetermined wavelength range.

As mentioned above, the plurality of output waveguides 230a-230r are positioned along a non-circular path 226. In some instances, the plurality of output waveguides 230a-230r each have substantially the same width at its corresponding output port. For the purpose of this application, the width of an output waveguide at its corresponding output port is measured as the distance from the leading edge segment to the trailing side of the waveguide in a direction that is perpendicular to the trailing side. For example, as shown in FIG. 2C, line 250 extends from edge segment 242 to the trailing side of the first waveguide 230a in a direction that is perpendicular to the trailing side of the first waveguide 230a, and thus represents the width of the first waveguide 230a at the first output port 224a. Similarly, line 252 represents the width of the second waveguide 230b at the second output port 224b.

For the purpose of this application, two or more waveguides are considered to have "substantially the same" width if the values of the widths of these waveguides are within 10% of each other. It should be appreciated that in some instances an optical splitter may be designed with less variation between the output waveguides at their corresponding output ports. For example, in some variations the plurality of output waveguides 230a-230r have corresponding widths at their respective output ports with values that are within 5% of each other. When the plurality of output waveguides has substantially the same width at the plurality of output ports, it is not necessary to taper the output waveguides to achieve a common waveguide size (though some level of tapering may still occur if desired), which can result in size savings relative to designs that including tapering of the output waveguides.

When the output ports of the plurality of output waveguides 230a-230r are positioned along a non-circular path as described above, the light may be more evenly spread when compared to star couplers having the same number of output ports. For the purpose of this application, the distribution of light between the a set of output waveguides is characterized by an "average coefficient of variation," which is the standard deviation of the average optical powers of the set of output waveguides divided by the mean of the average optical powers of the set of output waveguides. The "average optical power" of a given output waveguide is the average of the percentages of the input light that is received by that output waveguide across the predetermined range of wavelengths. The exact distribution of light between the output waveguides may vary as a function of wavelength, and thus the average optical powers of the output waveguides (and thus the average coefficient of variation) represents that overall performance of the optical splitter across is predetermined range of wavelengths.

In some variations, the plurality of output waveguides 230a-230r may be positioned such that the average coefficient of variation for the plurality of output waveguides 230a-230r across the predetermined range of wavelengths is less than 0.30. In some of these variations, the average coefficient of variation for the plurality of waveguides 230a-230r across the predetermined range of wavelengths is less than 0.20. In some of these variations, the average coefficient of variation for the plurality of waveguides 230a-230r across the predetermined range of wavelengths is less than 0.10. These average coefficients of variance may be achieved in embodiments where the plurality of waveguides have substantially the same width. Moreover, this performance may be also be achieved for wide bandwidths, such as when the predetermined range of wavelengths spans at least 500 nanometers, or when the predetermined range of wavelengths spans at least 1000 nanometers. Accordingly, the optical splitters described here may have vastly improved splitting performance when compared to conventional star couplers having the same number of output waveguides, while still realizing the space savings that come from the output waveguides 230a-230r having substantially the same width at their corresponding output ports.

The shape of the non-circular path 226 may depend on the number and size of the output waveguides 230a-230r as well as the preferred light distribution between the output waveguides 230a-230r. The non-circular path 226 has a shape with a length axis passing through a center of the shape and representing its longest dimension. The shape also has a width axis representing the longest dimension of the shape in a direction perpendicular to its length axis.

In some variations, the length axis of the shape of the non-circular path 226 is parallel to the direction along which the input waveguide 210 connects to the free propagation region 220. Accordingly, the width axis of the shape is perpendicular to this direction. In other variations, the length axis of the shape is positioned at a non-zero angle relative to this direction. For example, in some variations the length axis is positioned at an angle less than 10 degrees relative to the direction along which the input waveguide 210 connects to the free propagation region 220.

Figure 2A:
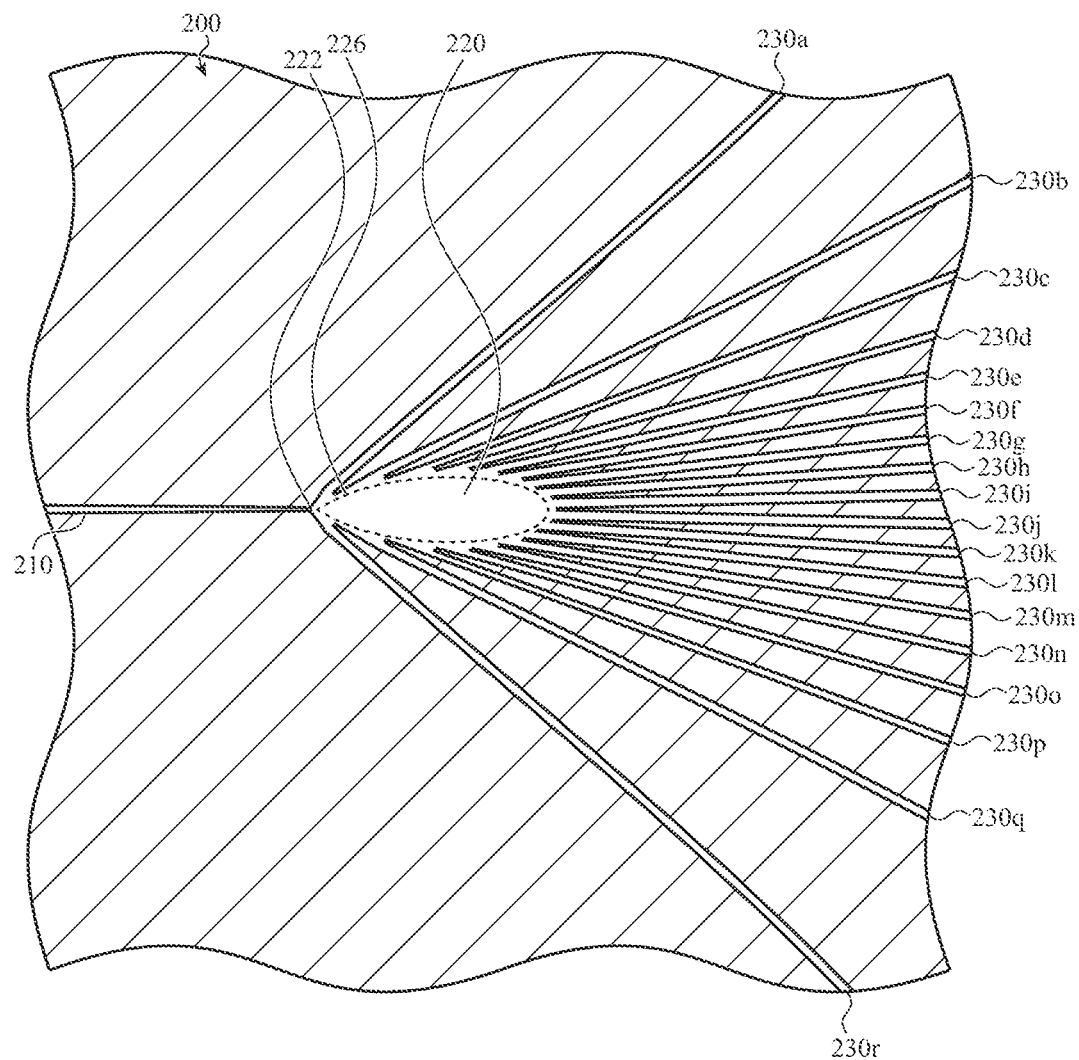
FIG. 2A depicts an example of an optical splitter as described herein
Figure 2B:
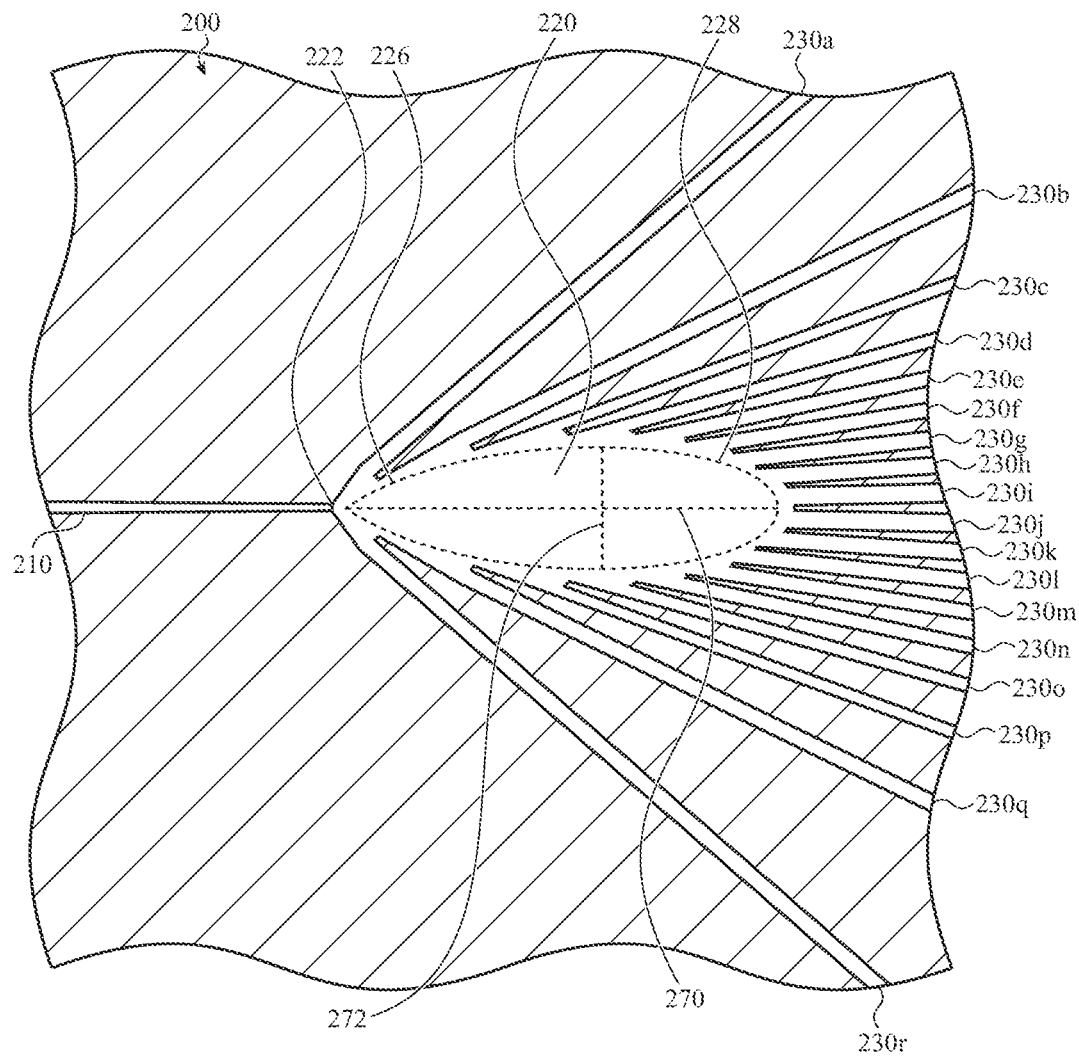
FIGS. 2B and 2C depict enlarged views of a portion of the optical splitter of FIG. 2A.
Figure 2C:
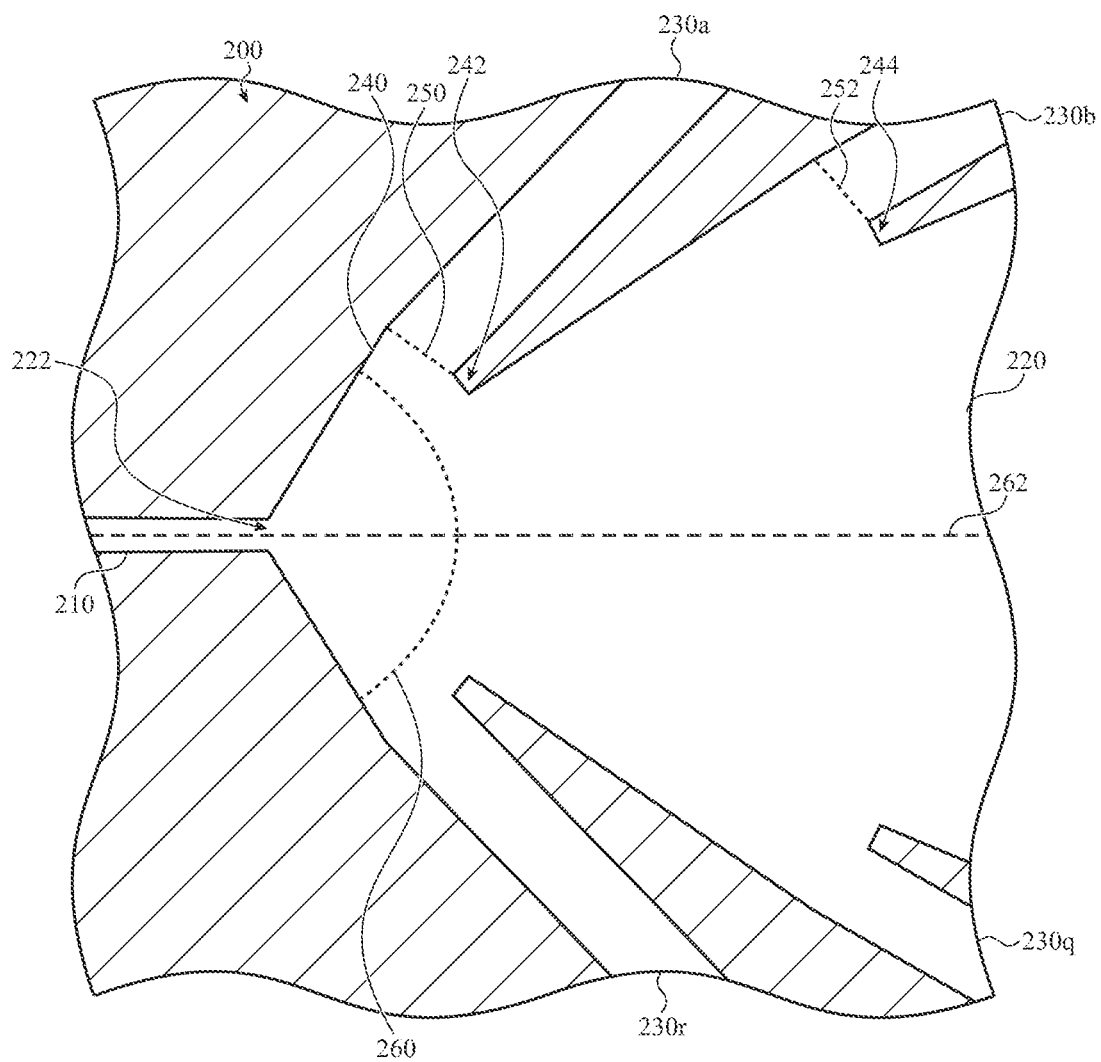
Figure 3:
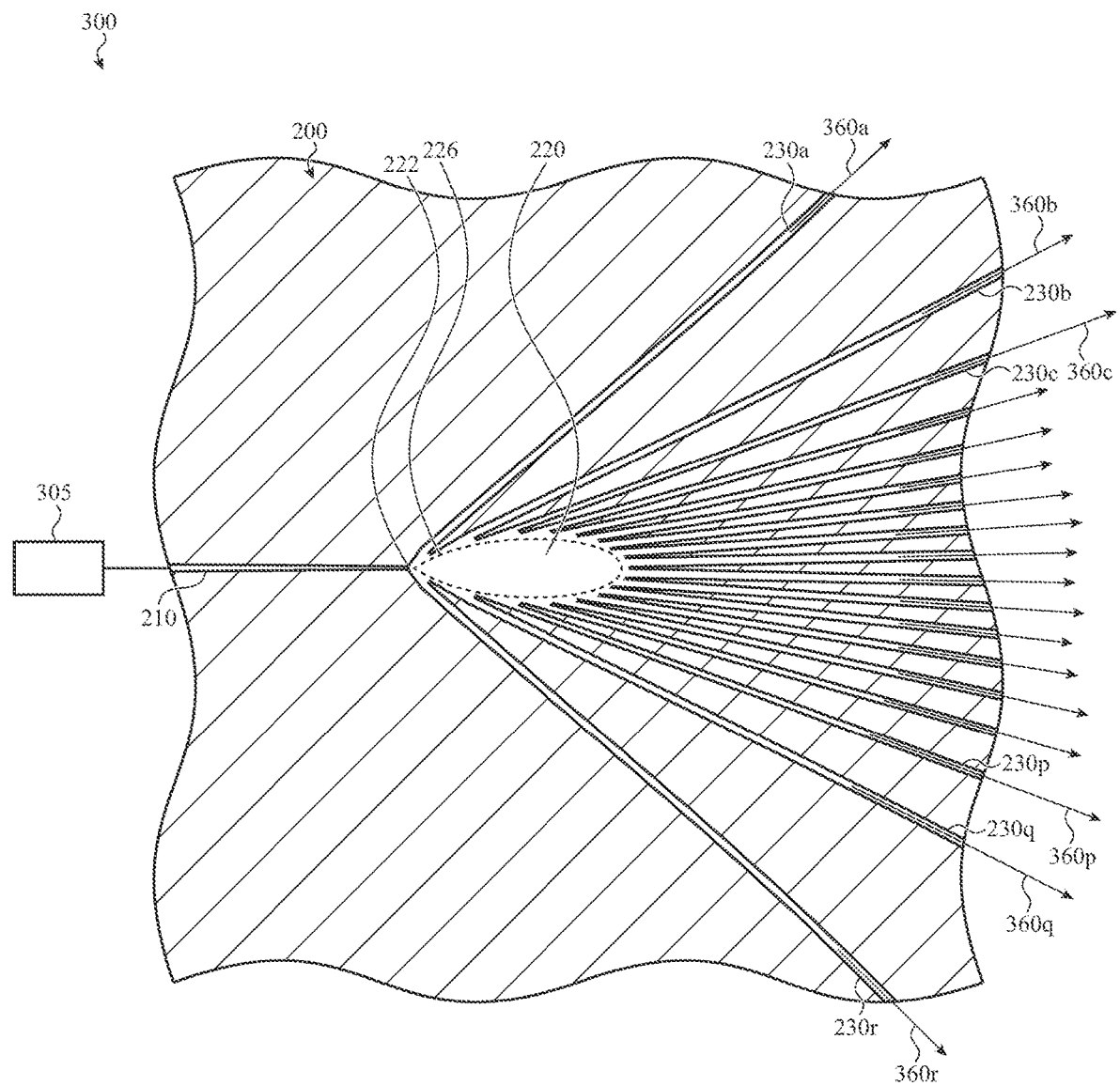
FIG. 3 illustrates an example optical system that uses the optical splitter of FIG. 2A-2C to split light received from a light source unit.

In some instances, such as the variation shown in FIGS. 2A-2C, the non-circular path 226 has an oval shape. The non-circular path 226 is centered around the free propagation region 220 and also defines a portion of the free propagation region 220 (specifically the portion of the free propagation region 220 that includes the plurality of output ports and any intervening edge segments). As such, this portion of the free propagation region 220 also has an oval shape.

As shown in FIG. 2B, the oval shape has a length axis 270 passing through a center of the oval and representing its longest dimension, and also has a width axis 272 representing the longest dimension of the oval in a direction perpendicular to its length. In some instances the oval is an ellipse, in which case the length axis 270 corresponds to the major axis of the ellipse and the width axis 272 corresponds to the minor axis of the ellipse. For the purpose of this application, the terms "oval" and "ellipse" are used to refer to a non-circular oval and a non-circular ellipse respectively. In the variation shown in FIGS. 2A-2C, the length axis 270 of the oval shape of the non-circular path 226 is parallel to the direction along which the input waveguide 210 connects to the free propagation region 220, and thus the width axis 272 of the oval shape is perpendicular to this direction. This direction is represented by line 262 in FIG. 2C. In other variations, the length axis 270 of the oval shape is positioned at a non-zero angle relative to this direction. For example, in some variations the length axis is positioned at an angle less than 10 degrees relative to the direction along which the input waveguide 210 connects to the free propagation region 220.

In variations where the output waveguides are positioned along a non-circular path 226 having an oval shape, the output waveguides are spaced at different distances from the length axis of the oval shape. These distances will vary based on how close each waveguide is to the width axis. For example, in the variation shown in FIGS. 2A-2C, the plurality of output waveguides includes a first set of output waveguides 230a-230d with output ports positioned on a first side of the length axis 270 and a first side of the width axis 272, such that they are positioned between the width axis 272 and the input waveguide 210. While the output port of output waveguide 230d intersects the width axis 272, for the purpose of discussion it is considered part of the first set of output waveguides. The output ports of the first set of output waveguides 230a-230e get further away from the length axis in a direction heading away from the input waveguide 210 (e.g., along line 262). Specifically, the first end waveguide 230a has an output port positioned closer to the length axis 270 than the output port of output waveguide 230b. The output port of output waveguide 230b is closer to the length axis 270 than the output port of the output waveguide 230c, which is closer to the length axis 270 than the output port of output waveguide 230d.

The plurality of output waveguides 230a-230r includes a second set of output waveguides 230e-230i with output ports that are positioned on a first side of the length axis 270 and a second side of the width axis 272, such that the width axis 272 is positioned between the input waveguide 210 and the output ports of second set of output waveguides 230e-230i. The output ports of the second set of output waveguides 230e-230i get closer to the length axis in a direction heading away from the input waveguide 210 (e.g., along line 262). In this way, the first set of output waveguides 230a-230d may have at least one output port that is closer to the length axis 270 than at least one output port of the second set of output waveguides 230e-230i, and at least one output port that is further away from the length axis 270 than at least one output port of the second set of output waveguides 230e-230i.

Similarly, the plurality of output waveguides 230a-230r includes a third set of output waveguides 230j-230n with output ports positioned on a second side of the length axis 270 and the second side of the width axis 272, as well as a fourth set of output waveguides 230o-230r with output ports on the second side of the length axis 270 and the first side of the width axis 272. Like the first set of output waveguides 230a-230d, the output ports of the fourth set of output waveguides 230o-230r are positioned further from length axis 270 in a direction heading away from the output port 210. Like the second set of output waveguides 230e-230i, the output ports of the third set of output waveguides 230j-230n are positioned closer to length axis 270 in a direction heading away from the output port 210.

While the variation of the optical splitter 200 shown in FIGS. 2A-2C is depicted as having 18 output waveguides 230a-230r, it should be appreciated that the optical splitters described here may have any suitable number of output waveguides depending on the needs of the optical systems incorporating these splitters. For example, in some variations an optical splitter as described herein includes at least 8 outputs. In some of these instances, the optical splitter includes at least 15 outputs. In some of these instances, the optical splitter includes at least 30 outputs. Similarly, while the optical splitter 200 is shown in FIGS. 2A-2C as having a single output waveguide, the optical splitter 200 may instead include two or more input waveguides, each connected to the free propagation region at a corresponding input port, and can split input light received via any of the input waveguides. The same principles described above apply, except that the far field boundary 260 in these variations represent the boundary at which input light will have reached the far field regardless of which input waveguide introduces the input light into the free propagation region 220. For example, a location in the free propagation region 220 is not considered part of the far field if input light received from a first input waveguide will have reached the far field at that location, but at which input light received from a second input waveguide will not have reached the far field at that location.

The optical splitters described herein can be used in an optical system to split light generated by one or more light sources. For example, FIG. 3 illustrates an example optical system 300 including the optical splitter 200 of FIGS. 2A-2C. The optical system 300 includes a light source unit 305 and optical splitter 200. The light source unit 305 is optically coupled to the input waveguide 210, such that light generated by the light source unit 305 is received by the input waveguide 210 and split by the optical splitter 200. This input light is split between the plurality of output waveguides 230a-230r as output light as discussed with respect to FIGS. 2A-2C. The output light for each of output waveguides 230a-230c and 230p-230r is depicted in FIG. 3 as arrows 360a-360c and 360p-360r respectively, though it should be appreciated that all of the output waveguides 230a-230r receive output light. The optical system 300 may route the output light from the plurality of output waveguides 230a-230r to other portions of the optical system as desired.

The light source unit 305 is configured to generate light having one or more wavelengths in the predetermined wavelength range associated with the optical splitter 200, such that the optical splitter 200 is able to achieve a desired amount of splitting between the output waveguides 230a-230r for any wavelength generated by the light source unit 305. For example, in some instances the light source unit 305 is capable of generating a set of wavelengths having a bandwidth of at least 500 nanometers, in which instance the optical splitter 200 is similarly configured to split light at all wavelengths within the set of wavelengths. In some of these instances, the light source unit 305 is capable of generating and the optical splitter 200 is configured to split a set of wavelengths having a bandwidth of at least 1000 nanometers. The light source unit 305 may be capable of generating wavelengths outside of the predetermined wavelength range, but in these instances the optical splitter 200 may not perform as intended.

To generate light in the predetermined range of wavelengths, the light source unit 305 includes a set of light sources (not shown), each of which is selectively operable to emit light at a corresponding set of wavelengths. Each light source may be any component capable of generating light at one or more particular wavelengths, such as a light-emitting diode or a laser. A laser may include a semiconductor laser, such as a laser diode (e.g., a distributed Bragg reflector laser, a distributed feedback laser, an external cavity laser), a quantum cascade laser, or the like. A given light source may be single-frequency (fixed wavelength) or may be tunable to selectively generate one of multiple wavelengths (i.e., the light source may be controlled to output different wavelengths at different times). The set of light sources may include any suitable combination of light sources, and collectively may be operated to generate light at any of a plurality of different wavelengths.

To the extent the light source unit 305 is capable of generating multiple different wavelengths, the light source unit 305 may be configured to generate different wavelengths of light simultaneously and/or sequentially. The light source unit 305 may be integrated into a PIC that includes the optical coupler 200, or may be separate from the PIC and couple light into the PIC. Additionally, the optical system may include additional components (not shown) between the light sources of light source unit 305 and the optical splitter 200, such that the light initially generated by the light source unit 305 may be altered before it reaches the optical splitter 200 as input light.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

ADDITIONAL STATEMENTS

1. An optical splitter configured to split input light having one or more wavelengths in a predetermined wavelength range, comprising: a free propagation region comprising an input port and a plurality of output ports; an input waveguide optically coupled to the free propagation region at the input port; and a plurality of output waveguides, wherein: each output waveguide of the plurality of waveguides is connected to the free propagation region at a corresponding output port of the plurality of output ports; the plurality of output waveguides each have the substantially same width; and the plurality of output ports is positioned such that the average coefficient of variation for the plurality of output waveguides across the predetermined wavelength range is less than 0.30.
2. The optical splitter of statement 1, wherein each output port of the plurality of output ports is positioned in a far field section of the free propagation region.
3. The optical splitter of statement 1 or statement 2, wherein each output waveguide of the plurality of output waveguides extends away from the corresponding output port along a Poynting vector of the input light at the corresponding output port.
4. The optical splitter of any preceding statement, wherein the plurality of output ports is positioned along a non-circular path.
5. The optical splitter of statement 4, wherein the non-circular path has an oval shape.
6. The optical splitter of statement 5, wherein the oval shape has a length axis that is parallel to a direction along which the input waveguide connects to the free propagation region.
7. The optical splitter of statement 5 or statement 6, wherein the plurality of output waveguides includes: a first set of output waveguides positioned on a first side of the width axis of the oval shape; and a second set of output waveguides positioned on a second side of the width axis of the oval shape.
8. The optical splitter of any preceding statement, wherein the predetermined wavelength range has a bandwidth of at least 500 nanometers.
9. An optical splitter operable to split input light having one or more wavelengths in a predetermined wavelength range, comprising: an input waveguide operable to receive the input light; a slab waveguide with an input port and multiple output ports and operable to receive the input light from the input waveguide at the input port; and multiple output waveguides connected to the slab waveguide at the multiple output ports, wherein: the multiple output ports are positioned along a non-circular path that is centered in the free propagation region; and the multiple output waveguides are positioned such that when the input light is introduced into the input waveguide, the multiple waveguides each receive output light.
10. The optical splitter of statement 9, wherein the average coefficient of variation for the multiple of output waveguides across the predetermined wavelength range is less than 0.30.
11. The optical splitter of statement 9 or statement 10, wherein each output port of the multiple of output ports is positioned in a far field section of the slab waveguide.
12. The optical splitter of any of statements 9 to 11, wherein the non-circular path has an oval shape.
13. The optical splitter of statement 12, wherein the oval shape is an ellipse.
14. An optical system comprising: a light source unit configured to generate input light having one or more wavelengths in a predetermined range of wavelengths; and an optical splitter optically coupled to receive the input light, the optical splitter comprising: a free propagation region comprising an input port and a plurality of output ports; an input waveguide optically coupled to the free propagation region at the input port; and a plurality of output waveguides, wherein: each output waveguide of the plurality of waveguides is connected to the free propagation region at a corresponding output port of the plurality of output ports; the plurality of output waveguides each have substantially the same width; and the plurality of output ports is positioned such that the average coefficient of variation for the plurality of output waveguides across the predetermined wavelength range is less than 0.30.
15. The optical system of statement 14, wherein each output port of the plurality of output ports is positioned in a far field section of the free propagation region.
16. The optical system of statement 14 or statement 15, wherein each output waveguide of the plurality of output waveguides extends away from the corresponding output port along a Poynting vector of the input light at the corresponding output port.
17. The optical system of any of statements 14 to 16, wherein the plurality of output ports is positioned along a path having an oval shape.
18. The optical system of statement 17, wherein the oval shape has a length axis that is parallel to a direction along which the input waveguide connects to the free propagation region.
19. The optical system of statement 17 or statement 18, wherein the plurality of output waveguides includes: a first set of output waveguides positioned on a first side of the width axis of the oval shape; and a second set of output waveguides positioned on a second side of the width axis of the oval shape.
20. The optical system of any of statements 14 to 19, wherein the predetermined wavelength range has a bandwidth of at least 500 nanometers.

What is claimed is:
1. An optical splitter configured to split input light having one or more wavelengths in a predetermined wavelength range, comprising:
   a free propagation region comprising an input port and a plurality of output ports;
   an input waveguide optically coupled to the free propagation region at the input port; and
   a plurality of output waveguides that comprise at least 15 output waveguides, wherein:
      each output waveguide of the plurality of waveguides is connected to the free propagation region at a corresponding output port of the plurality of output ports;
      each of the plurality of output ports is positioned along a non-circular path;
      the plurality of output waveguides each have substantially a same width; and
      the plurality of output ports is positioned such that an average coefficient of variation for the plurality of output waveguides across the predetermined wavelength range is less than 0.30.
2. The optical splitter of claim 1, wherein each output port of the plurality of output ports is positioned in a far field section of the free propagation region.
3. The optical splitter of claim 2, wherein each output waveguide of the plurality of output waveguides extends away from the corresponding output port along a Poynting vector of the input light at the corresponding output port.
4. The optical splitter of claim 1, wherein the non-circular path has an oval shape.

5. The optical splitter of claim 4, wherein the oval shape has a length axis that is parallel to a direction along which the input waveguide connects to the free propagation region.

6. The optical splitter of claim 4, wherein the plurality of output waveguides includes:
a first set of output waveguides positioned on a first side of a width axis of the oval shape; and
a second set of output waveguides positioned on a second side of a width axis of the oval shape.

7. The optical splitter of claim 1, wherein the predetermined wavelength range has a bandwidth of at least 500 nanometers.

8. An optical splitter operable to split input light having one or more wavelengths in a predetermined wavelength range, comprising:
an input waveguide operable to receive the input light;
a slab waveguide with an input port and multiple output ports and operable to receive the input light from the input waveguide at the input port; and
multiple output waveguides connected to the slab waveguide at the multiple output ports, wherein:
the multiple output ports are positioned along a non-circular path that is centered in a free propagation region and has a length axis and a width axis;
the multiple output waveguides are positioned such that when the input light is introduced into the input waveguide, the multiple output waveguides each receive output light; and
the multiple output waveguides include:
a first set of output waveguides positioned on a first side of the width axis of the non-circular path; and
a second set of output waveguides positioned on a second side of the width axis of the non-circular path.

9. The optical splitter of claim 8, wherein the average coefficient of variation for the multiple of output waveguides across the predetermined wavelength range is less than 0.30.

10. The optical splitter of claim 8, wherein each output port of the multiple of output ports is positioned in a far field section of the slab waveguide.

11. The optical splitter of claim 8, wherein the non-circular path has an oval shape.

12. The optical splitter of claim 11, wherein the oval shape is an ellipse.

13. An optical system comprising:
a light source unit configured to generate input light having one or more wavelengths in a predetermined range of wavelengths; and
an optical splitter optically coupled to receive the input light, the optical splitter comprising:
a free propagation region comprising an input port and a plurality of output ports;
an input waveguide optically coupled to the free propagation region at the input port; and
a plurality of output waveguides, wherein:
each output waveguide of the plurality of waveguides is connected to the free propagation region at a corresponding output port of the plurality of output ports;
each of the plurality of output ports is positioned along a non-circular path having an oval shape;
the oval shape has a width axis and a length axis that is longer than the width axis;
the length axis is parallel to a direction along which the input waveguide connects to the free propagation region;
the plurality of output waveguides each have substantially the same width; and
the plurality of output ports is positioned such that an average coefficient of variation for the plurality of output waveguides across the predetermined wavelength range is less than 0.30.

14. The optical system of claim 13, wherein each output port of the plurality of output ports is positioned in a far field section of the free propagation region.

15. The optical system of claim 14, wherein each output waveguide of the plurality of output waveguides extends away from the corresponding output port along a Poynting vector of the input light at the corresponding output port.

16. The optical system of claim 13, wherein the plurality of output waveguides includes:
a first set of output waveguides positioned on a first side of the width axis of the oval shape; and
a second set of output waveguides positioned on a second side of the width axis of the oval shape.

17. The optical system of claim 13, wherein the predetermined wavelength range has a bandwidth of at least 500 nanometers.

* * * * *